March 10, 1970  J. R. DOHOGNE ET AL  3,500,413

NAVIGATIONAL INSTRUMENT FOR DIRIGIBLE CRAFT

Filed Aug. 30, 1967

INVENTORS
James R. Dohogne
Doyle J. Kelly, Sr.

INVENTORS
James R. Dohogne
Doyle J. Kelly, Sr.

United States Patent Office 3,500,413
Patented Mar. 10, 1970

3,500,413
NAVIGATIONAL INSTRUMENT FOR DIRIGIBLE CRAFT
James R. Dohogne, Overland Park, and Doyle J. Kelly, Sr., Olathe, Kans., assignors to King Radio Corporation, Inc., Olathe, Kans., a corporation of Kansas
Filed Aug. 30, 1967, Ser. No. 664,514
Int. Cl. G01s 1/08
U.S. Cl. 343—107
10 Claims

ABSTRACT OF THE DISCLOSURE

A single navigation indicator operable to alternately display information in the manual VOR mode, or to utilize the same indicating and computing elements to present information in the automatic VOR mode. This instrument utilizes manual VOR (HSI or lateral deviation indicator) circuitry and may additionally make use of the course deviation signal therein by modulating, amplifying and applying same to a servo loop for the positioning of the course pointer and the course deviation bar in an automatic VOR (RMI) operating mode. A clutch operating course select knob facilitates the alternate selection of either mode of operation.

Background and brief description of the invention

For aircraft navigation convenience, a system, commonly referred to as V.H.F. Omni Range (VOR) provides a means to determine an aircraft's angular position relative to a ground station. VOR ground stations continually transmit bearing information on separate assigned frequencies in order that an aircraft using VVOR navigation may operate with a selected one (or more) of a plurality of such stations. This angular information bearing is in the form of two signals having a phase displacement therebetween which establishes a number of bearing radials corresponding to 360° on a compass.

Aircraft navigation to or from a selected VOR station is facilitated by selecting the frequency of said station, determining the proper radial as distinguished by its characteristic phase difference, and flying a course relative to a station using this radial as a flight path. This navigational aid is accomplished, in part, by indicating when an aircraft is on a selected VOR station radial or by determining which radial the aircraft is positioned on. A means to differentiate between radials and to identify them individually is necessary. For this purpose, advantage is taken of the fact that the phase difference between the two signals can be accurately determined. The phase difference between two signals, generated by a VOR station, is varied as the direction relative to the station changes so that a particular radial is represented by a particular phase difference. At the station a nondirectional reference signal is generated with a phase that at any instant is the same in all directions. A second signal is generated with a phase, relative to the nondirectional signal, that is unique and singularly dependent on relative angular position. The phase of the variable phase signal is the same as the phase of the reference signal only at the 0° radial (north). As the angle measured from the 0° radial increases, the phase of the variable phase signal lags the phase of the reference signal by the number of degrees of the angle from 0°. The reference and the variable phase signals, which are 30 Hz. intelligence, are transmitted on a V.H.F. radio frequency carrier signal to facilitate said transmission and subsequent reception. The VOR receiving equipment must separate the 30 Hz. reference and variable phase signals from the RF carrier and compare the phase of the two signals. This phase difference may be indicated in alternate forms on either a course deviation indicator or RMI.

A manual VOR receiver and indicator means may also be used to produce an output signal and visual display which is the result of a comparison between a selected course and the received VOR signals. The resultant signal, sometimes called the course deviation signal, is usable to operate an indicator or meter which will tell the pilot to steer to the right or to the left in order to achieve the selected course.

There are at least two basic informational modes available from a single VOR station. These two modes are commonly displayed on indicators referred to as HSI (Horizontal Situation Indicator) and as RMI (Radio Magnetic Indicator). The HSI is an instrument which provides a pictorial display of the navigation displacement situation relative to a VOR station. This instrument normally presents for navigation purposes:

(1) aircraft heading ($\psi$)
(2) selected VOR course and the course selector control knob
(3) course deviation ($\Delta$)
(4) To-From station pointer
(5) system warning flag This horizontal situation information relative to the VOR station is derived from a circuit commonly known as a manual VOR receiver. Such a receiver produces displacement signals relative to the selected course for the purpose of positioning the course deviation bar located therein. There are also indicators called OBI (Omni Bearing Indicator) which are used to present navigational information but do not display aircraft heading.

The RMI (Radio Magnetic Indicator) is an instrument which continually displays the actual bearing to a VOR station by means of a pointer which moves relative to a rotating azimuth dial. This instrument is utilized in conjunction with a receiver commonly known as an "Automatic" VOR. In an automatic VOR, the VOR receiver, by means of an internal servo loop, generates the actual bearing to the VOR station. When the aircraft heading is subtracted from the actual bearing, the result is the relative bearing which is then displayed on the above-mentioned RMI type of indicator.

Between the two information modes, the manual VOR (or HSI informational mode) is the most commonly used primarily due to the cost and complexity of providing both modes and, due to the fact that a course deviation is displayed directly in the manual mode. The automatic VOR information (the RMI informational mode) does provide information in a more useful form when the aircraft is not being flown on a selected course such as, but not limited to, when the pilot or navigator may be interested in position fixing, station orbiting and/or course interception. In general, each informational mode is more useful for a given navigation problem than the other and simultaneous operation of both modes is in practice hardly ever required.

Our invention is primarily concerned with providing a combined HSI/RMI system which makes available both manual and automatic VOR operational modes: In the instrument described infra, both modes of operation are derived from a single system thereby eliminating the need for the automatic portion of the VOR receiver, the heading input. In short, our invention makes use of a basic or standard manual VOR receiver and HSI and adds an additional servo loop to a common phase shifting device. When the additional servo loop is utilized, the operative effect is to position the course deviation bar of an HSI instrument in line with a course selector pointer, and rotatively move the bar and pointer as an RMI indicator (operating now in the RMI mode) in response to the course deviation signal derived from the manual VOR receiver. By selective utilization of the phase shifting device (such as a resolver) either operational mode is available to pilot according to the particular navigation problem.

An object of the invention is to provide a single navigation instrument that is operable to display, in the alternative, either HSI or RMI information. An important feature of the invention lies in the fact that this instrument can be constructed at significantly lower costs than separate and independent HSI and RMI instruments. As a result, general aviation now has available both informational modes in a single instrument so that a separate RMI (and the associated automatic VOR receiver) can be eliminated.

Another object of the invention is to provide an instrument of the character described that simplifies both construction complexities and operational use as well as reducing to a considerable degree the size, including weight and bulk, of the subject device. A typical flight situation involving the complementary use of HSI and RMI heretofore utilized two individual and distinctly separate circuits. Our invention makes this complementary information available in a single instrument without cumbersome, repetitious and needless use of expensive circuitry and indicators.

A further object of the invention is to provide a combined HSI/RMI navigation instrument that may be monitored for proper functioning in the RMI mode by observing the position of the course deviation bar (or similar display elements).

Other and further objects of the invention, together with the features of novelty appurtenant thereto, will appear in the course of the following description.

Detailed description of the invention

In the accompanying drawings, which form a part of the specification and are to be read in conjunction therewith, like reference numerals indicate like parts in the various views.

Figure 1:
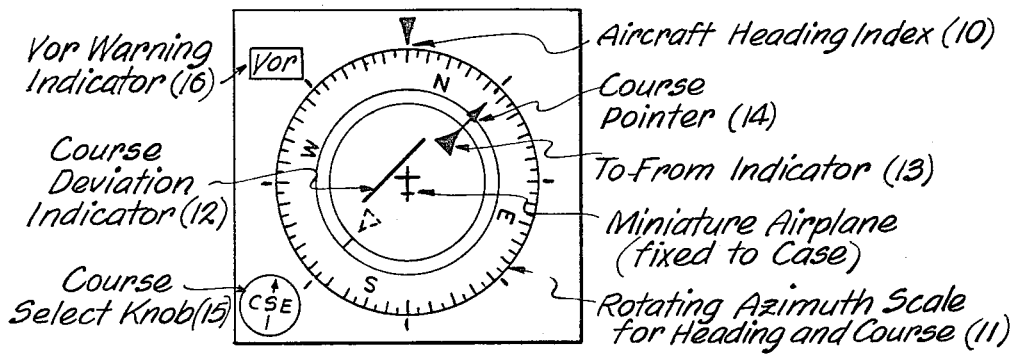
FIG. 1 is a front elevational view of the face of the combined HSI/RMI instrument.
Figure 2:
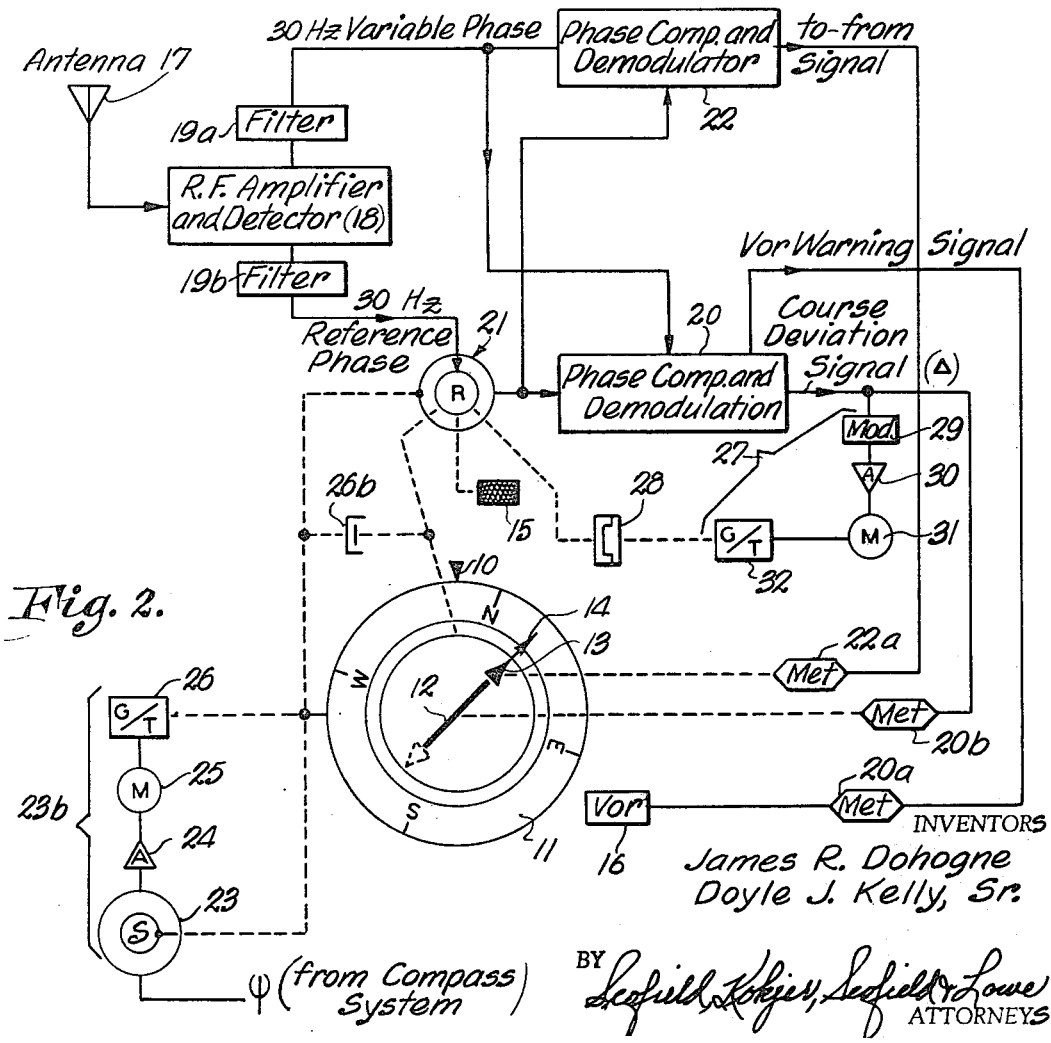
FIG. 2 is a block diagram of the combined instrument, including the manual receiver circuit and the associated servo loops.
Figure 3:
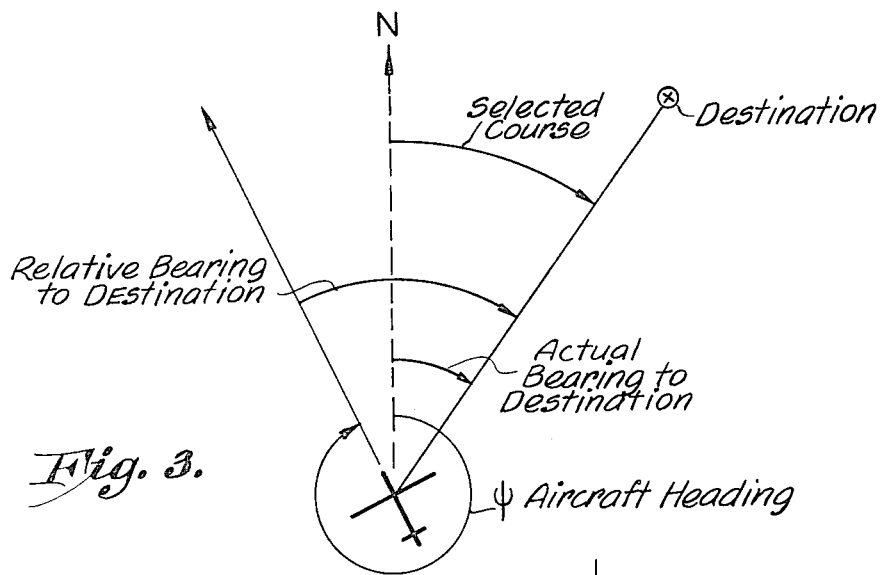
FIG. 3 is an azimuthal representation of an aircraft with respect to a destination.

The face of the combined HSI/RMI indicator in shown in FIG. 1. The aircraft heading ($\Psi$) is read at the top of the instrument at the indicia mark 10 against the rotative scaled azimuth card 11. Selected course or bearing, depending upon the operating mode, may be read by a course pointer 14 against azimuth card 11. A course deviation indicator (CDI) bar 12 is shown displaced from a centered position in FIG. 1, thereby indicating an HSI mode of operation and that the aircraft is displaced to the right of the selected course. CDI bar 12, in FIG. 2 shows zero displacement from the select course and is in line with the To-Form indicator 13. When in the latter condition, with the To-Form indicator showing a "To," the instrument may be considered to be operating in the RMI mode.

The course pointer 14 is positionably controllable either in the HSI mode by a course selector knob 15 or, in the RMI mode, by a servo loop, discussed infra. In the upper left corner of the instrument in a VOR warning indicator 16 which, as the name implies, is operated from a warning signal developed in the receiver circuitry.

As suggested above, the navigational instrument is operated in response to the electro-magnetic field transmitted from a VOR station. The VOR electro-magnetic field is composed of the radiation from two ground based antennas, radiating at the same carrier frequency. The first is a nondirectional antenna radiating an amplitude modulated carrier. The frequency of the modulating signal varies from 9,480 Hz. to 10,440 Hz., back to 9,480 Hz. thirty (30) times per second. That is, a 9,960 Hz. subcarrier amplitude modulates the RF carrier and is, itself, frequency modulated by 30 Hz.

The second antenna at the ground station is a horizontal dipole which rotates at the rate of thirty revolutions per second. The dipole produces a figure 8 field pattern. The RF voltages within the two lobes are 180° out of phase with each other. The RF within one of the lobes is exactly in phase with the RF radiated from the nondirectional antenna and the RF within the other lobe is 180° out of phase with a nondirectional field. The rotating figure 8 pattern reinforces the nondirectional pattern on the in phase side of the dipole and subtracts from the nondirectional pattern on the out-of-phase side. This results in a cardioid field pattern which rotates at a rate of 30 revolutions per second, the rate at which the dipole antenna rotates.

The signal at an aircraft within range of the VOR station is an RF carrier with amplitude varying at a rate of 30 Hz. because of the rotation of the cardioid pattern. The carrier is also amplitude modulated at the station by the 9,960 Hz. signal which is, in turn, frequency modulated by the 30 Hz. reference signal. The 30 Hz. reference signal is frequency modulated on a subcarrier so that it may be separated from the 30 Hz. variable phase signal.

Turning now to FIG. 2, the signal received by antenna 17 must be separated into variable phase and reference phase channels before bearing and/or course information can be extracted. The RF carrier is amplified and AM detected by the RF amplifier and detector indicated by the numeral 18. The output from the AM detector is the 30 Hz. variable phase signal and the 9,960 Hz. signal which is frequency modulated by the 30 Hz. reference phase signal. The detector output is fed to a variable phase channel and reference phase channel. The frequency modulated 9,960 Hz. signal is eliminated from the variable phase channel by low pass filter 19a. The 30 Hz. variable phase reference signal then enters a phase comparator 20 as one of two inputs.

The reference phase signal, on its 9,960 Hz. subcarrier passes through a 9,960 Hz. pass band filter 19b to eliminate the 30 Hz. variable phase signal. A conventional FM detector (not shown) recovers the 30 Hz. reference voltage from the 9,960 Hz. subcarrier and applies this reference voltage to a phase shifting circuit shown schematically as being applied to the rotor of resolver 21. The amount of phase shift is controlled in the HSI (or RMI) mode by the relative angular position of the rotor and stator of the resolver. (Note: Course selector knob 15 is mechanically linked to the rotor of resolver 21 for manual positioning thereof.) The output from the phase shifter enters both phase comparators 20 and 22 for comparison with the variable phase signal. The two comparators (and associated modulators) have output signals correlating to course deviation and position To or From the station, respectively.

The 30 Hz. reference phase signal from phase shifting device 21 is further applied, as one of two inputs, to comparator and demodulator 22. The other input to phase comparator 22 is the 30 Hz. variable phase signal. The relative phase of the two signals is dependent upon the direction of the aircraft from the station with respect to the direction set beneath the course pointer 14. When a heading of the direction given beneath the course pointer would direct the aircraft toward the station, a "To" indication is given. As shown in FIG. 2, an electrical output from the modulator 22 to a conventional meter movement 22a and an associated mechanical linkage over to the "To" indicating arrow will control the "To" registration indication for visual reading. When the heading of a direction given beneath the course pointer would direct the aircraft away from the station, the To-From signal will alternately operate the meter movement 22a so that a "From" indication (shown in broken lines in FIGS. 1 and 2) is given on the instrument face.

In a similar fashion, phase comparator 20 has the same two inputs as comparator 22 (phase shifted reference phase from resolver 21 and variable phase). The primary output from phase comparator and demodulator 20 is the course deviation signal ($\Delta$). This deviation signal is representative of the difference between a selected course and the actual course on which the aircraft is located relative to the VOR station. When a difference signal or deviation signal emanates from phase comparator 20, meter movement and associated linkage 20b will be accordingly activated to move CDI bar 12 so that the pilot is informed of the aircraft's position with respect to the selected course. Stated differently, if the course deviation bar is moved to the left of a centered position, the pilot is informed that he must fly to the left to get back on course. All of this course deviation information is available from a manual VOR receiver in the normal HSI informational mode.

Course pointer 14, To-From indicator 13, CDI bar 12 are mounted on a common yoke assembly which rotates concentrically with azimuth card 11. The phase comparator and demodulator 20 has a second output denoted as a malfunction signal developed therein and directed to meter movement 20a for operation of the VOR warning flag. When no signal or less than normal signal is present, the warning flag will not be concealed and a system malfunction indication is displayed. Azimuth scale 11 is positioned to indicate aircraft heading ($\Psi$). A signal representing $\Psi$ from the compass system is put through a servo loop including synchro 23, a servo amplifier 24, motor 25 and gear train and mechanical linkage 26 to appropriately position the rotative azimuth card so that the aircraft heading may be read against the index 10.

The rotor and stator of resolver 21 are directly linked to the course pointer 14 (via yoke assembly) and azimuth card 11, respectively. In this manner, the electrical output of the resolver is representative of the angular position of course pointer 14 with respect to azimuth card 11. To further illustrate the operative embodiment, note in FIG. 2 the direct mechanical connection of the stator of a "pancake" resolver 21 with azimuth card 11 and the similar direct mechanical connection of the rotor of resolver 21 with course pointer 14 (yoke assembly). Friction clutch 26b is mounted between the rotor and stator of resolver 21 so that the position of course pointer 14 relative to azimuth card 11 is not affected when the heading servo loop (generally indicated by numeral 23b) causes a rotation of the azimuth card 11 in response to an aircraft heading change. However, the friction level of the clutch is adjusted in order that the resolver rotor (and consequently pointer 14) will move relative to azimuth card 11 whenever a new course is selected by rotation of the course knob 15 (HSI mode) or by the output of the servo later described loop 27 (RMI mode). Further, the friction level of clutch 26b is such that the positioning of the course pointer 14 in either of the above-mentioned modes will not change the position of the azimuth card 11 relative to index 10.

The indicator may be switched to the RMI operational mode by engaging clutch 28. The engagement of clutch 28 may be facilitated by a convenient push-pull movement of knob 15. With clutch 28 engaged, the effect of the course deviation signal is fed back to the manual VOR receiver via the angular position of the rotor and stator of resolver 21 so that the variable phase and the reference phase 30 Hz. signals are maintained in phase, thusly aligning course pointer 14 to indicate the bearing to station in an RMI fashion and centering the CDI bar 12.

As the course deviation signal $\Delta$ coming from phase comparator and demodulator 20 is normally a DC signal, and since it is desirable to use an alternating current servo mechanism, a solid state modulator 29 receives the demodulated course deviation signal $\Delta$ and converts this direct current to alternating current of required frequency. The modulator converts the deviation signal into a phase sensitive proportional AC signal at 400 Hz. The modulated signal is then fed in its relatively low power level to a power amplifier 30 which is capable of driving servomotor 31. Motor 31 is linked to the rotor of resolver 21 by gear train 32 and clutch 28. The gear train will drive the rotor of resolver 21 in a direction determined by the phase of the incoming DC signal. This motion, imparted to the rotor of resolver 21 causes the deviation signal $\Delta$ to go to 0. As a result, course pointer 14 indicates the bearing of the station when read against azimuth card 11 and therefore becomes a Radio Magnetic Indicator. In the above state, the circuit is stable, and the course deviation bar is centered as the deviation signal is effectively nulled. Any variations from this null position, which for instance may be caused by the aircraft maneuvering, station bypassing, etc., are for display purposes eliminated, as there is a continuing nulling process occurring via servo loop 27. As a desirable feature of this mechanization, the position of the CDI bar relative to the center of the instrument in the DMI mode serves as a performance monitor for servo loop 27; e.g. when loop 27 is properly causing pointer 14 to indicate bearing to station, the CDI bar will be centered.

When it is desired to return to the HSI mode of operation, clutch 28 may be disengaged and servo loop 27 made inoperative as far as controlling resolver 21.

Figure 4:
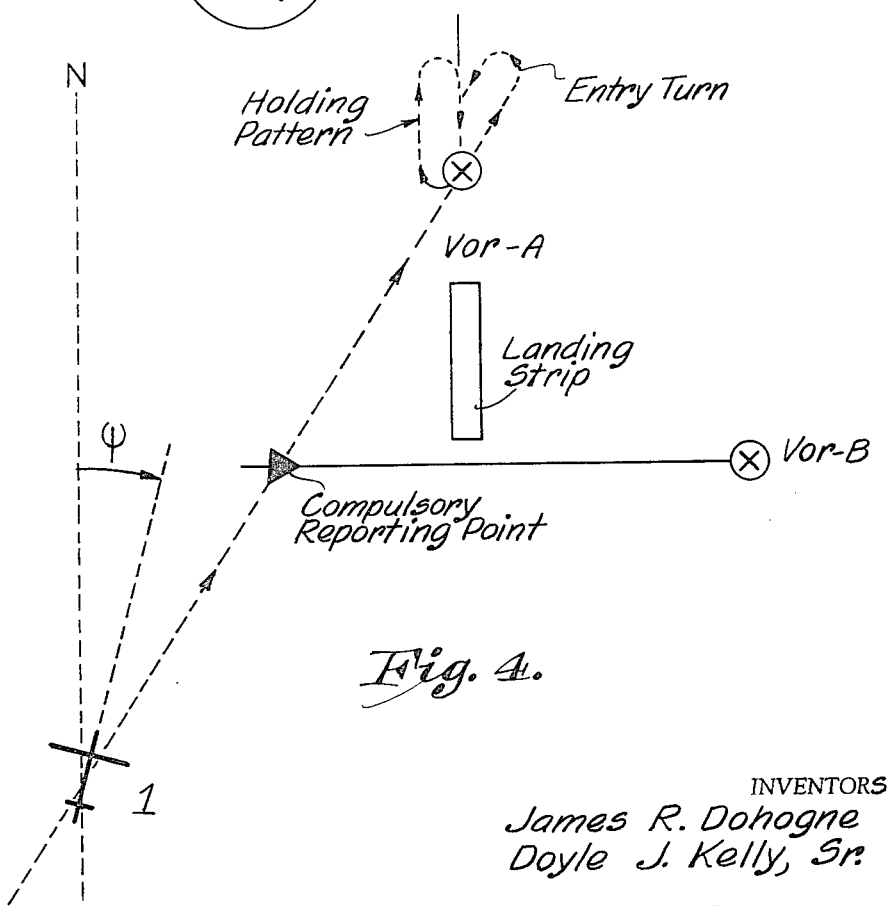
FIG. 4 is a plot of a typical flight situation.

The operational and complementary use of the combined HSI/RMI may be seen by reference to FIG. 4 and by the following, rather simple, but typical flight situation from a present position indicated by the numeral 1 to a VOR station A and landing strip. While enroute from position 1 to the landing strip, a compulsory reporting point is encountered and a course intercept from VOR B will be utilized for the identification of same.

Assume that the aircraft at position 1 is on a heading of $\Psi$ with respect to magnetic north and is on an arbitrary radial from VOR station A. At this point, further assume that the aircraft has not been navigating with respect to VOR station A and does not know his position relative to that VOR station.

The pilot's first action would be to select the frequency on which VOR station A is transmitting. This frequency is obtainable either from IFR charts, or the station can be orally identified by transmitted code. With the combined HSI/RMI instrument, the pilot could select the RMI informational mode by depressing course knob 15 and automatically obtain the course to the station by the course pointer 14 which is read against rotating azimuth card 11. As stated above, when clutch 28 is engaged by depressing course knob 15, the course pointer is automatically servoed to the position which results in the cancelling of the course deviation error signal and further results in the To-From indicator registering a "To" indication. Assuming that the heading of the aircraft remains constant, the pilot, in order to go to VOR station A, simply turns to the course indicated by reading the course pointer against the rotating azimuth scale. The pilot has thus assumed a new heading, e.g. the course to VOR station A, and in the absence of any cross wind will maintain a heading which is identical to the course necessary to reach that station.

Ordinarily the pilot will now pull out push-pull knob 15 thusly placing the instrument in the HSI informational mode. Any deviation from the course to the VOR station A will immediately be displayed by motion CDI bar 12 to the right or left of the center line of the instrument. It is again stressed that each mode need not be used with the other informational mode. This is particularly true when operating in the HSI mode and the course deviation exceeds a plus or minus 10 degrees. In this instance, the conventional HSI instrument deviation bar will be displaced to its physical limit and thus will give information only that a course error of 10 degrees or more exists. The RMI informational mode is thus more useful when the course deviation (Δ) exceeds 10°.

Enroute utilization of the RMI informational mode can now be illustrated by considering VOR station B. While holding a heading to maintain the desired course to VOR station A, the pilot is able to obtain a bearing to VOR station B. The desirability of knowing this bearing to VOR station B may be necessary either from a positive identification requirement, or, as shown in FIG. 4, a compulsory reporting point may be defined by a given radial from VOR station B and a gicen radial from VOR station A. In order to establish the intersection based on published bearing from the two VOR stations, the RMI informational mode has greater utility than does the HSI mode. To determine this intersection (compulsory reporting point) the pilot would maintain his present course to VOR station A. He would then place the instrument in the RMI mode and select the frequency of the VOR station B. Assume that the intersection defined by the compulsory reporting point triangle is on the 270° radial from VOR station B and that the aircraft is still on course to VOR station A. While in the RMI operating mode and on the VOR station B frequency, the pilot would know when he reached the compulsory reporting point by reading the number 90 (east) on the rotating card 11 against course pointer 14. The pilot has now identified the intersection as defined by the radials from VOR stations and may continue on to VOR station A by changing the frequency of the receiver to again correspond to station A and pulling out knob 15 to again place the instrument in the HSI mode.

As the aircraft approaches the station A, assume the pilot is required to enter the holding pattern on the north course from station A. In order to do this, the pilot must first identify that he has passed VOR station A and then execute a proper turn to enter a standard holding pattern (a four minute pattern with turns to the right). Since the pilot is operating the instrument in the HSI mode, the approach to the station and station passage is identified by the To-Form arrow moving from the "To" position to the "From" position. Because of the convergence of the radials near the station and the zone of confusion that is directly above the station, the course deviation bar is oftentimes erratic. Because of this uncertainty, and the attendant oscillations of the CDI bar, the accepted procedure approaching the station or passing over a station and for a short time after having passed over the station is to disregard the CDI bar and to fly constant heading.

When the zone of uncertainty or confusion is encountered, the combined HSI/RMI instrument can be more effectively by engaging the RMI mode. The RMI mode will cause the course pointer to be servoed in a direction that points to the station at all times and will display positive bearing information to the pilot while he passes over or near the station. This advantage over the HSI mode is that course deviations quite often exceed the plus or minus ten degrees when near the station. Station passage, in the RMI mode, is identified by 180° change in bearing to the station and is significant information to the pilot during the station passage. Additionally, the To-From indicator provides a valid display of station passage in the RMI mode as well as in the HSI mode.

Returning again to the establishment of a holding pattern on the north radial of VOR station A, the pilot will typically continue to fly until he has passed VOR station A and will then execute a teardrop entry turn of approximately 180° about one to two miles northeast of the VOR station. While performing this entry turn, the RMI mode is more useful because of the closeness to the station and the consequent rapid change in bearing information. As the pilot establishes the intercept course (approximately 225°) for the zero radial from VOR station A, he may then place the instrument in the HSI mode, select the 180° course and will have established an intercept angle of approximately 45°. While maintaining this heading of 225° in the HSI mode, the pilot will know he is on the north radial when the course deviation bar is centered. Operation of the HSI/RMI instrument in the holding pattern will, in general, involve use of the HSI mode when intercepting and tracking the 0° radial, and use of the RMI mode in the remainder of the holding pattern.

As shown in the FIG. 4, the landing strip is located directly south of VOR station A. The standard procedure for executing a VOR approach, in general, involves holding patterns and clearances from higher flight levels successively down to the approach altitude. As should now be obvious, landing the aircraft on the indicated landing strip from the described and pictured holding pattern is aided significantly by both modes of operation.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A combined navigation instrument alternately displaying information in either a HSI mode or RMI mode comprising:
   a manual VOR receiver circuit,
   a course selector means, said VOR receiving circuit and said selector means being operable in the HSI mode to facilitate the manual selection of a desired course to a VOR station and to produce course deviation signals when said selected course is deviated therefrom, and
   means interconnecting said course selection means and said deviation signals to selectively cause said course selector means to automatically indicate the course to said station or to an alternate station, thereby operating said instrument in the RMI mode and displaying continuous RMI information.

2. The invention as in claim 1 wherein said selector means includes a phase shifting circuit, said phase shifting circuit operable to shift a reference phase signal in correlation with the manually selected course, said deviation signals thereby resulting from a comparison between the shifted reference phase signal and a received VOR reference phase signal, said phase shifting circuit comprising a resolver having a rotor and a stator, said course selector means having a course pointer, said pointer being movable with said resolver, and wherein said interconnecting means includes a servo loop which is operable in the RMI mode to cause the position of said rotor to change as a function of the course deviation signal.

3. The invention as in claim 2 wherein said servo loop is connected to the rotor of said resolver through a clutch means, said clutch means operable to allow selective alternate utilization of either the HSI mode or the RMI mode.

4. The invention as in claim 2 wherein said instrument includes a course deviation bar interconnected with said deviation signals to indicate deviation from said selected course in said HSI mode, the position of said course deviation bar relative to the center of said instrument operating as a performance monitor while in the RMI mode thereby acting to verify that the RMI relatively displayed bearing is correct.

5. The invention as in claim 2 wherein said instrument includes a rotating azimuth card, and a course deviation bar, and wherein said stator is connected to said azimuth card and said rotor is connected to said course pointer, said rotor and stator connections being such that an output from said resolver is representative of the angular position of the course pointer with respect to said azimuth card, a friction clutch mounted between the rotor and the stator of said resolver to assure that said course pointer maintains its relative angular position with respect to said azimuth card during azimuth card rotation as a result of heading change.

6. The invention as in claim 5 including a means for overriding said clutch to allow said course pointer to move independently of said azimuth card in said selected RMI mode.

7. A combined navigational instrument for dirigible crafts comprising:
   a rotating azimuth card,
   a course pointer,
   a course deviation indicator bar,
   means including a manual VOR receiver circuit for operating said instrument as a Horizontal Situation Indicator (HSI), and
   means operatively connected to said receiver circuit for alternately operating said receiver circuit, said card and said course pointer as a Radio Magnetic Indicator (RMI).

8. The invention as in claim 7 wherein the position of said course deviation indicator bar relative to the center of the instrument operates as a performance monitor in the RMI mode thereby acting to verify that the RMI relative displayed bearing is correct.

9. The invention as in claim 7 wherein said receiver circuit includes a course selector means operatively connecting said course pointer and facilitating the manual selection of a desired course to a VOR station, said course selector means being further operable to produce course deviations signals when said dirigible craft deviates from said selected course, said selector means including a phase shifting circuit, said phase shifting circuit operable to shift a reference phase signal in correlation with selected course, said deviation signal thereby resulting from a comparison between the shifted reference phase signal and a received VOR variable phase signal, said phase shifting circuit comprising a resolver having a rotor and a stator, said course pointer being movable with said resolver, and wherein said receiver circuit connecting means includes a servo loop interconnecting said course selection means and said deviation signals in the RMI mode to position said rotor as a function of the course deviation signals.

10. The invention as in claim 9 wherein said stator is connected to said azimuth card and said rotor is connected to said course pointer, said rotor and stator connections being such that an output from said resolver is representative of the angular position of the course pointer with respect to said azimuth card, and wherein the dirigible heading may be read on said azimuth card, said instrument including a friction clutch mounted between the rotor and stator of said resolver so that said course pointer maintains its relative angular position with respect to said azimuth card during azimuth card rotation as a result of heading change.

References Cited
UNITED STATES PATENTS

| | | | |
|---|---|---|---|
| 2,860,335 | 11/1958 | Kellogg | 343—107 |
| 2,932,024 | 4/1960 | Sant Angelo | 343—107 X |
| 2,999,237 | 9/1961 | Cypser et al. | 343—107 |
| 3,234,552 | 2/1966 | Bostwick | 343—112 X |
| 3,261,017 | 7/1966 | Luftig | 343—107 X |
| 3,281,846 | 10/1966 | King | 343—107 |

RODNEY D. BENNETT, JR., Primary Examiner

MALCOLM F. HUBLER, Assistant Examiner

U.S. Cl. X.R.

340—24; 346—8